United States Patent [19]

Kang et al.

[11] Patent Number: 5,738,292
[45] Date of Patent: Apr. 14, 1998

[54] SELECTIVE CONTINUOUS ANTI-REVERSE MECHANISM FOR A FISHING REEL

[75] Inventors: Young J. Kang, Tulsa, Okla.; John Wayne Chapman, Franksville, Wis.

[73] Assignee: Zebco Division of Brunswick Corporation, Tulsa, Okla.

[21] Appl. No.: 501,312

[22] Filed: Jul. 12, 1995

[51] Int. Cl.$^6$ ............................................ A01K 89/02
[52] U.S. Cl. ................................. 242/247; 242/299
[58] Field of Search ............................ 242/247, 248, 242/298, 299

[56] References Cited

U.S. PATENT DOCUMENTS

| | | |
|---|---|---|
| 3,050,271 | 8/1962 | Hull . |
| 3,146,966 | 9/1964 | Dunn . |
| 3,198,456 | 8/1965 | Wood . |
| 3,259,333 | 7/1966 | Hull . |
| 4,323,203 | 4/1982 | Neufeld . |
| 4,359,197 | 11/1982 | Neufeld . |
| 4,391,418 | 7/1983 | Puryear . |
| 4,463,916 | 8/1984 | Puryear . |
| 4,492,347 | 1/1985 | Moss . |
| 4,522,347 | 6/1985 | Swisher . |
| 4,523,726 | 6/1985 | Swisher . |
| 4,676,450 | 6/1987 | Carpenter et al. . |
| 4,735,376 | 4/1988 | Hlava . |
| 4,923,141 | 5/1990 | Sazaki et al. . |
| 5,020,738 | 6/1991 | Yamaguchi . |
| 5,042,741 | 8/1991 | Aota . |
| 5,139,214 | 8/1992 | Sato . |
| 5,145,125 | 9/1992 | Morimoto ............................ 242/299 X |
| 5,318,243 | 6/1994 | Hitomi et al. . |
| 5,370,330 | 12/1994 | Uehara et al. ....................... 242/247 |
| 5,372,323 | 12/1994 | Hirano et al. ....................... 242/299 |
| 5,485,969 | 1/1996 | Yamaguchi . |
| 5,503,343 | 4/1996 | Hirano et al. ....................... 242/247 |
| B1 4,676,450 | 6/1991 | Carpenter et al. . |

FOREIGN PATENT DOCUMENTS

| | | |
|---|---|---|
| 2254534 | 10/1992 | United Kingdom ................. 242/247 |
| 2258595 | 2/1993 | United Kingdom . |
| 2266827 | 11/1993 | United Kingdom . |

*Primary Examiner*—Daniel P. Stodola
*Assistant Examiner*—Emmanuel M. Marcelo
*Attorney, Agent, or Firm*—Wood, Phillips, VanSanten, Clark & Mortimer

[57] ABSTRACT

A fishing reel having a frame and an operating mechanism on the frame including a line carrying spool, a first element for directing line onto the line carrying spool, first structure cooperating between the first element and frame for mounting the first element for rotation relative to the frame in a first direction about a first axis as an incident of which line is wrapped around the line carrying spool, and second structure selectively preventing the first element from rotating oppositely to the first direction around the first axis. The second structure includes a clutch assembly having inner and outer rings, third structure cooperating between the first element and one of the inner and outer rings for keying the one of the inner and outer rings to the first element so that the one of the inner and outer rings is fixed against rotation relative to the first element around the first axis, fourth structure cooperating between the inner and outer rings for a) permitting rotation of the other of the inner and outer rings relative to the inner and outer rings in one direction around the first axis and b) preventing rotation of the other of the inner and outer rings relative to the one of the inner and outer rings oppositely to the one direction around the first axis, and fifth structure cooperating between the frame and clutch assembly for selectively c) limiting rotation of the other of the inner and outer rings relative to the frame and d) permitting continuous rotation of the other of the inner and outer rings relative to the frame.

10 Claims, 2 Drawing Sheets

SELECTIVE CONTINUOUS ANTI-REVERSE MECHANISM FOR A FISHING REEL

BACKGROUND OF THE INVENTION

1. Field of the Invention

This invention relates to fishing reels of the type having a rotary element that is movable in a first rotational direction to direct line onto a line carrying spool and, more particularly, to a mechanism for selectively preventing movement of the rotary element in a second rotational direction that is opposite to the first rotational direction.

2. Background Art

In most fishing reels, a rotary element is utilized to direct line onto a line carrying spool. In a spinning reel, a rotor rotates to draw line in a wrapping motion around an oscillating line carrying spool. In spincast type fishing reels, a spinner head rotates to perform the same function as the rotor on the spinning reel. In a baitcast fishing reel, the spool itself is rotated to effect line retrieval.

It is well known to incorporate anti-reverse mechanisms into all types of fishing reels to limit backward movement of the rotary element. In one exemplary mechanism, a cooperating pawl and ratchet confine this backward rotation. Typically, the pawl directly or indirectly follows movement of the rotary element. With the rotary element advancing in a line retrieve direction, the pawl is disengaged from the ratchet. In response to backward rotation of the rotary element, the pawl shifts to move between adjacent ratchet teeth and thereby arrest further backward movement of the rotary element.

There are at least two significant drawbacks with the pawl and ratchet anti-reverse mechanisms discussed above. Normally, the ratchet teeth are spaced from each other sufficiently that a certain amount of backward movement of the rotary element occurs before the pawl moves into a blocking position between the teeth. This lag time, commonly referred to in the industry as a "dead spot", is undesirable, particularly when the fisherman is setting the hook in a fish's mouth.

This lag time is not only undesirable from the standpoint of how it compromises the performance of the fishing reel, but also in that it may be accountable for damage to the fishing reel. For example, as the user snaps the rod to set the hook, the rotor, spinner head, or spool abruptly back up and jolt the drive train upstream of where the anti-reverse mechanism is situated. Consequently, over time, the parts may wear excessively or, in a worst case, prematurely fail.

It is known to increase the number of ratchet teeth to thereby diminish the lag time. However, this solution is somewhat self-defeating in that the freer teeth are more prone to being sheared by the pawl during operation.

Another problem with prior art anti-reverse mechanisms is that they are normally located on the drive train so that a substantial portion of the drive train moves in reverse prior to engagement of the anti-reverse mechanism. Further, the shock induced by the arresting of the backward movement of the rotary element may be transmitted through a significant portion of the drive train. The problem of parts being excessively stressed and/or failing is thus constantly contended with.

In co-pending application Ser. No. 08/357,863, entitled "Continuous Anti-Reverse Mechanism for a Fishing Reel", now abandoned, a full time one-way clutch ring is shown as part of an anti-reverse mechanism. The clutch ring is shown on the rotor shaft between the spool and a pinion gear used to drive the rotor shaft. Accordingly, the clutch ring absorbs any shock that would otherwise be transmitted to the pinion gear and the remaining portion of the drive train between the pinion gear and the crank handle. This clutch ring gives effectively an instantaneous response so that there is no lag as would produce a shock due to the abrupt application of a reverse torque on the shaft.

While this anti-reverse mechanism has been very effective, it has one significant limitation in that reverse rotation of the shaft with which it is associated is at all times prohibited.

SUMMARY OF THE INVENTION

In one form of the invention, a fishing reel is provided having a frame and an operating mechanism on the frame including a line carrying spool, a first element for directing line onto the line carrying spool, first structure cooperating between the first element and frame for mounting the first element for rotation relative to the frame in a first direction about a first axis as an incident of which line is wrapped around the line carrying spool, and second structure selectively preventing the first element from rotating oppositely to the first direction around the first axis. The second structure includes a clutch assembly having inner and outer rings, third structure cooperating between the first element and one of the inner and outer rings for keying the one of the inner and outer lings to the first element so that the one of the inner and outer rings is fixed against rotation relative to the first element around the first axis, fourth structure cooperating between the inner and outer rings for a) permitting rotation of the other of the inner and outer rings relative to the inner and outer rings in one direction around the first axis and b) preventing rotation of the other of the inner and outer rings relative to the one of the inner and outer rings oppositely to the one direction around the first axis, and fifth structure cooperating between the frame and clutch assembly for selectively c) limiting rotation of the other of the inner and outer rings relative to the frame and d) permitting continuous rotation of the other of the inner and outer rings relative to the frame.

In one form, the fifth structure includes an actuator, structure for mounting the actuator to the frame for movement selectively relative to the frame between first and second positions, and structure cooperating between the actuator and the other of the inner and outer rings for limiting rotation of the other of the inner and outer rings relative to the frame with the actuator in the first position and permitting continuous rotation of the other of the inner and outer rings relative to the frame with the actuator in the second position.

The fifth structure may include an intermediate member, with structure for mounting the intermediate member to the frame for movement relative to the frame between engaged and disengaged positions, and structure cooperating between the intermediate member and the other of the inner and outer rings for limiting rotation of the other of the inner and outer rings relative to the frame with the intermediate member in the engaged position and for permitting continuous rotation of the other of the inner and outer rings relative to the frame with the intermediate member in the disengaged position. The fifth structure further includes structure cooperating between the actuator and intermediate member for moving the intermediate member from its disengaged position into its engaged position as an incident of the actuator moving from its second position into its first position.

The fifth structure may include structure cooperating between the intermediate member and frame for biasing the intermediate member towards one of the engaged and disengaged positions.

The structure for mounting the actuator to the frame may mount the actuator to the frame for rotation about an axis that is parallel to the first axis.

The structure for mounting the intermediate member to the frame may mount the intermediate member to the frame for rotation about an axis that is transverse to the first axis.

In one form, the structure cooperating between the actuator and the other of the inner and outer rings includes a finger on the intermediate member and a notch on the other of the inner and outer rings defining a shoulder, and the finger resides in the notch and is abuttable to the shoulder with the intermediate member in the engaged position to limit rotation of the other of the inner and outer rings relative to the frame.

The other of the inner and outer rings may have a peripheral surface, with the notch extending through the peripheral surface.

A plurality of the notches may extend through the peripheral surface on the other of the inner and outer rings, with each notch defining a shoulder that is abuttable to the finger on the intermediate member.

In one form, the first element includes a first shaft and the operating mechanism includes a rotatable crank handle, a crank shaft extending transversely to the first shaft, and structure for transmitting a rotative force from the crank shaft to the first shaft. The second structure is spaced from the rotative force transmitting structure and resides between the force transmitting structure and the line carrying spool.

In one form, the fourth structure includes a plurality of cylindrical roller elements acting between the inner and outer rings.

In another form of the invention, a fishing reel is provided having a frame and an operating mechanism on the frame including a line carrying spool, a first element for directing line onto the line carrying spool and including a first shaft, first structure cooperating between the first element and frame for mounting the first element for rotation relative to the frame in a first direction about a first axis as an incident of which line is wrapped around the line carrying spool, and second structure for selectively preventing the first element from rotating oppositely to the first direction around the first axis in a reverse direction. The second structure includes a clutch assembly having inner and outer rings, third structure cooperating between the inner ring and first shaft for keying the inner ring against rotation relative to the first shaft around the first axis, fourth structure cooperating between the inner and outer rings for a) permitting rotation of the first shaft and inner ring in a line retrieval direction relative to the outer ring, and b) preventing rotation of the first shaft and inner ring in a reverse direction opposite to the line retrieval direction relative to the outer ring, and fifth structure for selectively c) limiting rotation of the outer ring relative to the frame to thereby limit rotation of the first shaft and inner ring in the reverse direction relative to the frame and d) permitting continuous rotation of the outer ring relative to the frame to thereby permit the first shaft and inner ring to rotate continuously in the reverse direction relative to the frame.

DETAILED DESCRIPTION OF THE DRAWINGS

Figure 1:
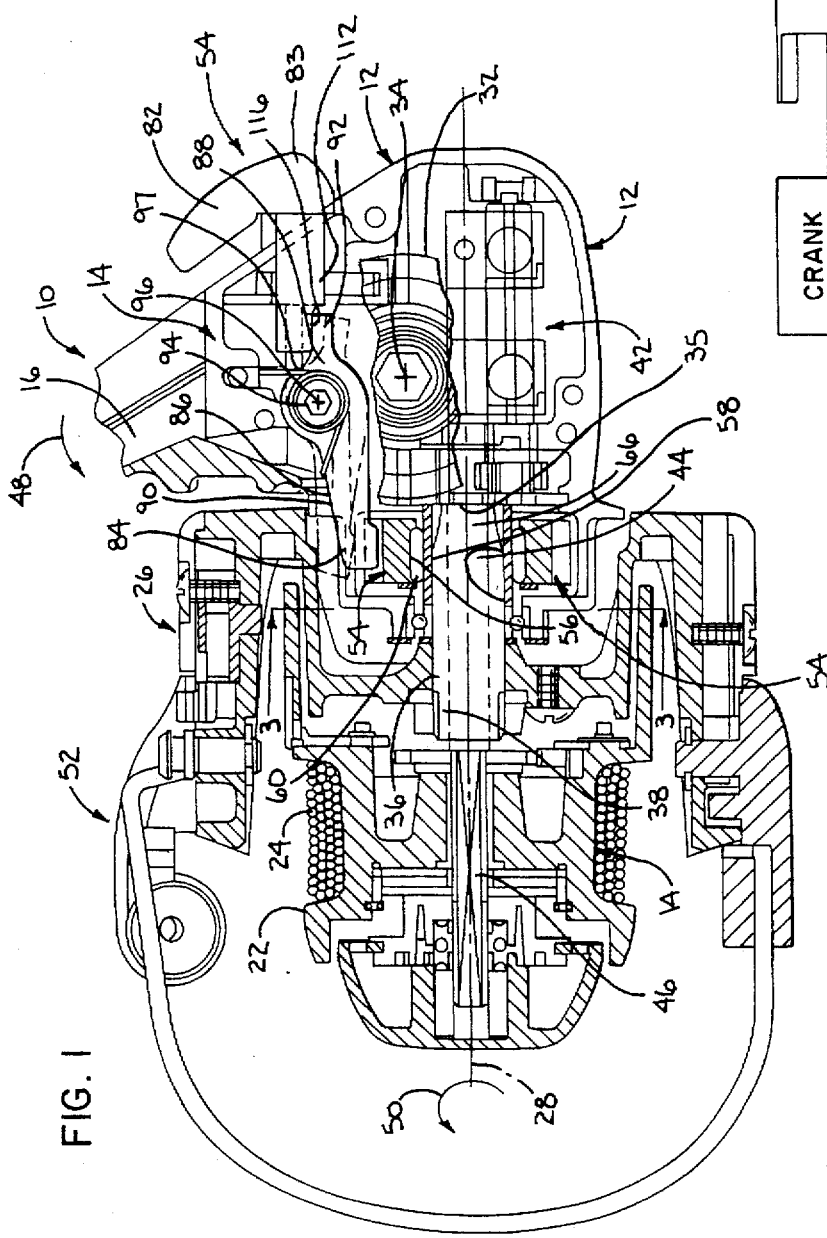
FIG. 1 is a fragmentary, cross-sectional view of a spinning fishing reel having an anti-reverse mechanism with a clutch assembly, according to the present invention, incorporated therein.
Figure 2:
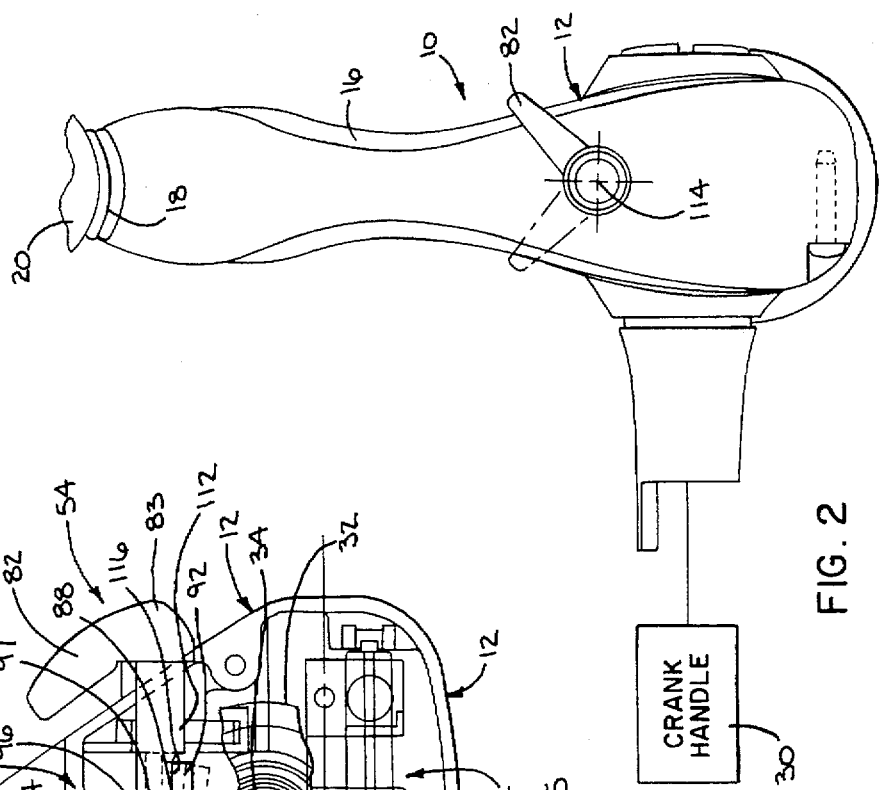
FIG. 2 is a rear elevation view of the fishing reel in FIG. 1.

In FIGS. 1 and 2, one type of fishing reel, suitable for incorporation of the present invention, is shown at 10. The fishing reel 10 is a spinning-type fishing reel. The details of the operating mechanism for a conventional spinning reel of this type are set out fully in U.S. Pat. No. 4,676,450, to Carpenter et al, which is incorporated herein by reference.

Briefly, the fishing reel 10 has a frame 12 that supports an operating mechanism 14. The frame 12 at least partially encases the operating mechanism 14 and extends continuously upwardly therefrom to form a mounting stem 16, which terminates at a mounting foot 18, that can be attached in conventional fashion to a fishing rod 20.

The operating mechanism 14 has a cylindrical spool 22 upon which a supply of fishing line 24 is wrapped. A rotor 26 is rotatable about a fore and aft axis 28 to draw the line around the spool 22 in a wrapping motion to effect retrieval thereof.

Rotation is imparted to the rotor 26 through a crank handle, shown schematically at 30 in FIG. 2. The crank handle 30 rotates a face gear 32 about a laterally extending axis 34. The gear 32 in turn transmits a rotative force through a pinion gear 35 to a sleeve shaft 36, which rotates about the axis 28, which is substantially at a right angle to the axis 34. The forward end 38 of the sleeve shaft 36 is secured to the rotor 26 so that the rotor 26 and sleeve, shaft 36 rotate together as a single element.

Rotation of the crank handle 30 also effects operation of an oscillating mechanism at 42, which moves a shaft 44 within the sleeve shaft 36 reciprocatively in a fore and aft direction. The forward end 46 of the shaft 44 is connected to the spool 22. As the shaft 44 reciprocates, the spool 22 moves similarly back and forth in the line of the axis 28 so that the rotor 26 effects an even distribution of line 24 thereon.

As the crank handle 30 is rotated around the axis 34 in the direction of the arrows 48 in FIG. 1, the rotor rotates in the direction of the arrow 50, i.e. in a clockwise direction as viewed from the front of the reel, to effect line retrieval.

The line 24 can be released from the spool 22 by repositioning a bail assembly 52 from a retrieve position to a cast position, with the latter position shown in FIG. 1. In the cast position, the line 24 is allowed to freely pay off of the spool 22.

Some users wish to be able to pay out line from the spool 22 with the bail assembly 52 in the retrieve position by reversely rotating the crank handle 30 i.e. oppositely to the rotational direction indicated by the arrow 48. At the same time, it is desirable to be able to selectively prevent reverse rotation of the crank handle 30, as might otherwise allow undetected payout of line 24, as when a fish is drawing on the line 24.

According to the invention, an anti-reverse clutch assembly is provided at 54, as shown in FIGS. 1–5, to selectively a) block reverse rotation of the sleeve shaft 36 and rotor 26 and b) permit continuous reverse rotation of the sleeve shaft 36 and rotor 26.

The clutch assembly 54 includes an outer ring 56 and a concentric inner ring/sleeve 58. A plurality of cylindrical roller bearings 60 are disposed equidistantly around an inside annular edge 62 on the outer ring 56 and coact with the inner ring 58 in such a manner that relative rotation between the inner ring/sleeve 58 and outer ring 56 is permitted in only one direction around the central axis 64 thereof.

One-way clutch assemblies of this type are well known in the art. For example, a suitable commercially available one-way clutch assembly is offered by Koyo Seiko, and identified as its Part No. P/N 1WC1012 one-way roller bearing.

The present clutch assembly 54 is custom made by Seitz, principally because of the unique configuration of the outer ring 56, as described hereinafter.

The clutch assembly 54 is mounted to the sleeve shaft 36 at a location spaced from the pinion gear 35 between the pinion gear 35 and the spool 22. The inner ring/sleeve 58 can be preassembled to the outer ring 56 by a simple press fit step. The clutch assembly 54 consisting of the outer ring 56 and inner ring 58, can then be slid as a unit into the operative position of FIG. 1 over the sleeve shaft 36.

The rear portion 66 of the sleeve shaft 36 has two diametrically opposite, oppositely facing, flat surfaces 68, 70, which make a keyed connection with a correspondingly-shaped inside sin-face 72 on the inner ring 58. That is, the inner ring 58 has inner flat surfaces 74, 76 which facially abut to the flat surfaces 68, 70 on the sleeve shaft 36 so that the inner ring 58 and sleeve shaft 36 cannot relatively rotate around the fore and aft central axis 28 of the reel. Accordingly, the inner ring 58 follows movement of the sleeve shaft 36 in rotation about the axis 28.

Figure 3:
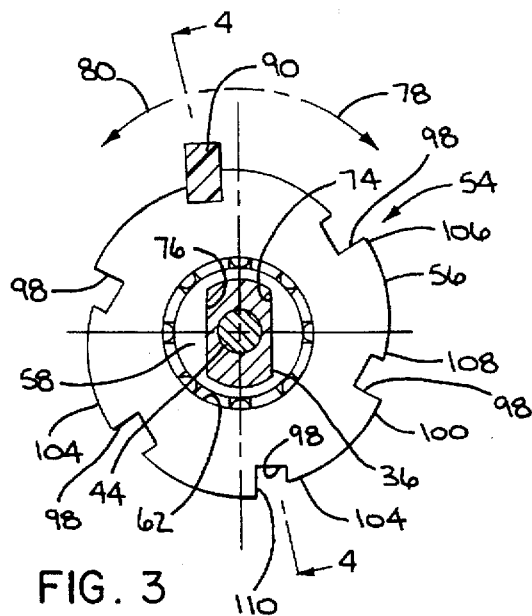
FIG. 3 is reduced, a cross-sectional view of a rotor shaft on the fishing reel with the clutch assembly thereon and taken along line 3—3 of FIG. 1.
Figure 4:
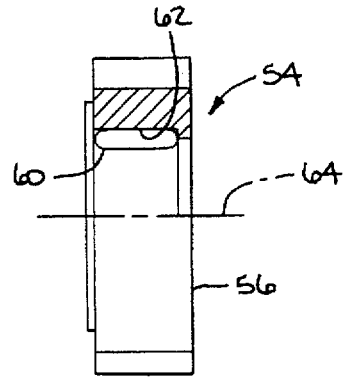
FIG. 4 is a reduced, cross-sectional view of the clutch assembly taken along line 4—4 of FIG. 3.
Figure 5:
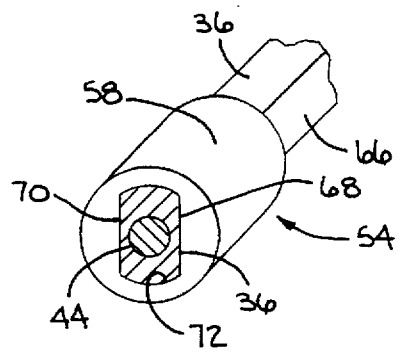
FIG. 5 is a reduced, fragmentary, perspective view of an inner ring on the inventive clutch assembly keyed to the rotor shaft on the fishing reel of FIGS. 1 and 2.
Figure 6:
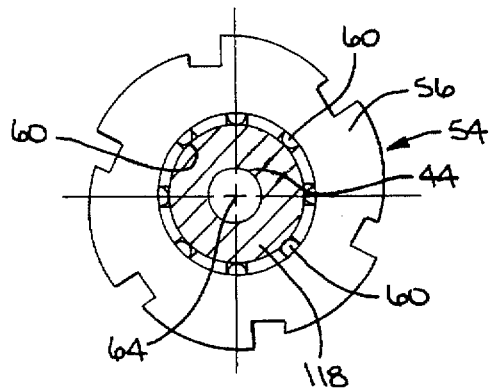
FIG. 6 is an end elevation view of a modified form of clutch assembly, according to the present invention, attached to a rotor shaft.

As seen in FIG. 3, rotation of the rotor 26, sleeve shaft 36 and inner ring 58 in a retrieve direction, i.e. in the direction of the arrow 78 in FIG. 6 around the axis 28, is permitted relative to the outer ring 56. On the other hand, reverse rotation of the rotor 26, sleeve shaft 36, and inner ring 58 relative to the outer ring 56, in the direction of the arrow 80, is almost instantaneously blocked.

With this arrangement, the invention contemplates that the outer ring 56 can be selectively a) blocked against rotation relative to the frame 12, to thereby prevent reverse rotation of the sleeve shaft 36, rotor 26, and inner ring 58, and b) allowed to continuously rotate relative to the frame 12, whereupon the rotor 26, sleeve shaft 36, inner ring 58, and outer ring 56 can rotate as a unit in the reverse direction of rotation for the sleeve shaft 36.

To accomplish this, the invention employs an actuator 82 with an external grippable knob 83 and a movable, intermediate member 84 that cooperates between the actuator 82 and the outer ring 56. The intermediate member 84 has a body 86, with a generally cylindrical mounting portion 88 and an elongate finger 90 projecting in cantilever fashion forwardly from the mounting portion 88. A cantilevered actuating arm 92 projects rearwardly from the mounting portion 88 at a location diametrically opposite to where the finger 90 departs from the mounting portion 88.

The mounting portion 88 is supported upon a post 94 on the frame 12 for pivoting movement about a laterally extending axis 96. The intermediate member 84 is pivotable between an engaged position, shown in solid lines in FIG. 1, and a disengaged position shown in phantom in FIG. 1. A formed wire spring 97 normally biases the intermediate member 84 to the engaged position.

The finger 90 is arranged to seat in notches 98 formed through a peripheral surface 100 on the outer ring 56. In operation, as the outer ring 56 moves in the direction of the arrow 80, the finger 90 will bear on the, peripheral surface 100 thereof under the action of the spring 97. The finger 90 will either move directly into one of the notches 98 or encounter one of the surface portions 104 between notches 98. In this latter situation, continued rotation of the outer ring 56 will cause the finger 90 to guide along the surface portion 104 to the next adjacent notch 98.

To facilitate seating of the finger 90 in the notches; 98, each of the surface portions 104 is curved so that the leading end 106 thereof is radially outside of the trailing end 108 thereof. As the finger 90 encounters the surface portion 104, it is progressively biased radially inwardly by the spring 97 as it travels along the surface portion 104 from the leading end 106 to the trailing end 108 until it encounters a raised shoulder 110 at the leading end 106 of the adjacent surface portion 104. As this occurs, the spring 102 will bias the finger 90 into that notch 98. The coaction of the finger 90 and shoulder 110 limits rotation between the intermediate member 84 and outer ring 56 and thus the outer ring 56 and the frame 12.

The intermediate member 84 is released from its engaged position by the actuator 82. The actuator 82 has a cylindrical body 112 that guides the actuator 82 in rotation about a fore and aft axis 114 between the first position, shown in solid lines in FIG. 2 and corresponding to the engaged position for the intermediate member 84, and a second position, shown in phantom lines in FIG. 2 and corresponding to the disengaged position for the intermediate member 84.

The actuator body 112 has an offset arm 116 which engages the actuating arm 92 on the intermediate member 84. Movement of the actuator 82 from the first position to the second position causes the arm 116 to act upon the arm 92 on the intermediate member 84 to thereby exert a force to cause the intermediate member 84 to pivot clockwise in FIG. 1 to the disengaged position.

It can be seen that the inner ring 58 and outer ring 56 can be readily pre-assembled and slid onto the sleeve shaft 36 into the operative position of FIG. 1. By engaging the intermediate member 84, the outer ring 56 is fixed against rotation relative to the frame 12 such that the sleeve shaft 36 with the rotor 26 thereon cannot reversely rotate. By disengaging the intermediate member 84, the sleeve shaft 36 and rotor 26 thereon can freely rotate in the reverse direction together with the outer ring 56.

The location of the clutch assembly 54 in FIG. 1 is preferred in that any tendency of the sleeve shaft 36 to reverse is arrested before the reversing force can be imparted to the pinion gear 35 and through the remaining drive train structure between the pinion gear 35 and the crank handle 30.

The invention also contemplates that the inner ling 58 can be eliminated. As seen in FIG. 6, the outer ring 56 can be directly attached to a cylindrical shaft 118, corresponding to the sleeve shaft 36, in which the spool shaft 44 is journalled for rotation. The shaft 118 then functions as an inner ring, corresponding to the inner ring 58. This embodiment of the invention will otherwise function identically to the previously described embodiment.

The foregoing disclosure of specific embodiments is intended to be illustrative of the broad concepts comprehended by the invention.

We claim:

1. A fishing reel comprising:

a frame; and an operating mechanism on the frame including a line carrying spool, a first element for directing line onto the line carrying spool, first means cooperating between the first element and frame for mounting the first element for rotation relative to the frame in a first direction about a first axis as an incident of which line is wrapped around the line carrying spool, and second means for selectively preventing the first element from rotating oppositely to the first direction around the first axis, wherein the second means comprises a clutch assembly having inner and outer rings, third means cooperating between the first element and the inner ring for keying the inner ring to the first element so that the inner ring is fixed against rotation relative to the first element around the first axis, fourth means cooperating between the inner and outer rings for a) permitting rotation of the outer ring relative to the inner ring in one direction around the first axis and b) preventing rotation of the outer ring relative to the inner ring oppositely to the one direction around the first axis, and fifth means cooperating between the frame and clutch assembly for selectively c) limiting rotation of the outer ring relative to the frame and d) permitting continuous rotation of the outer ring relative to the frame, wherein the fifth means comprises an actuator, means for mounting the actuator to the frame for movement selectively relative to the frame around an axis that is parallel to the first axis between first and second positions, and means cooperating between the actuator and the outer ring for limiting rotation of the outer ring relative to the frame with the actuator in the first position and permitting continuous rotation of the outer ring relative to the frame with the actuator in the second position, wherein the means cooperating between the actuator and outer ring comprises an intermediate member having a finger thereon and means for mounting the intermediate member to the frame for movement relative to the frame between engaged and disengaged positions, the finger acting against the outer ring to thereby limit rotation of the outer ring relative to the frame with the intermediate member in the engaged position, the outer ring being rotatable relative to the frame with the intermediate member in the disengaged position, there further being means cooperating between the actuator and intermediate member for moving the intermediate member from its disengaged position into its engaged position as an incident of the actuator moving from its second position into its first position, wherein the means for mounting the intermediate member to the frame comprises means for mounting the intermediate member to the frame for rotation about an axis that is transverse to the first axis.

2. The fishing reel according to claim 1 wherein the fifth means includes means cooperating between the element having the finger thereon and frame for biasing the element with the finger thereon towards the engaged position.

3. The fishing reel according to claim 1 wherein the fifth means comprises an actuator and means for mounting the actuator to the frame for rotation about an axis that is parallel to the first axis.

4. The fishing reel according to claim 1 wherein the defines a shoulder and the finger resides in the notch and is abutted to the shoulder with the element with the finger thereon in the engaged position to limit rotation of the outer relative to the frame.

5. The fishing reel according to claim 1 wherein there are a plurality of notches through the peripheral surface of the outer ring, each defining a shoulder that is abuttable to the finger.

6. The fishing reel according to claim 1 wherein the first element includes a first shaft, the operating mechanism includes a rotatable crank handle, a crank shaft extending transversely to the first shaft and means for transmitting a rotative force from the crank shaft to the first shaft and the second means is spaced from the rotative force transmitting means and resides between the rotative force transmitting means and the line carrying spool.

7. The fishing reel according to claim 1 wherein the fourth means includes a plurality of cylindrical roller elements acting between the inner and outer rings.

8. A fishing reel comprising:

a frame; and an operating mechanism on the frame including a line carrying spool, a first element for directing line onto the line carrying spool, first means cooperating between the first element and frame for mounting the first element for rotation relative to the frame in a first direction about a first axis as an incident of which line is wrapped around the line carrying spool, and second means for selectively preventing the first element from rotating oppositely to the first direction around the first axis, wherein the second means includes a clutch assembly having inner and outer rings, third means cooperating between the first element and the inner ring for keying the inner ring to the first element so that the inner ring is fixed against rotation relative to the first element around the first axis, fourth means cooperating between the inner and outer rings for a) permitting rotation of the outer ring relative to the inner ring in one direction around the first axis and b) preventing rotation of the outer ring relative to the inner ring oppositely to the one direction around the first axis, and fifth means cooperating between the frame and clutch assembly for selectively c) limiting rotation of the outer ring relative to the frame and d) permitting continuous rotation of the outer ring relative to the frame, wherein the fifth means comprises an element having a finger thereon that is selectively repositionable between engaged and disengaged positions, wherein the outer ring comprises a peripheral surface with a radial extent from the first axis and notch through the peripheral surface to accept the finger, the peripheral surface having a portion thereof that has a leading end and a trailing end, with the leading end at the notch, and the radial extent of the surface portion is greater at the leading end of the surface portion than at the trailing end of the surface portion, said finger being moved radially inwardly relative to the first axis toward the peripheral surface of the outer ring as it moves from the disengaged position into the engaged position, wherein upon encountering the surface portion at the leading end, the finger is guided by the surface portion radially inwardly relative to the first axis into the slot as the first element rotates oppositely to the first direction, wherein the fifth means comprises an actuator and means for mounting the actuator to the frame for rotation about an axis that is parallel to the first axis, wherein the element with the finger thereon is pivotable about an axis that is transverse to the first axis between the engaged and disengaged positions.

9. A fishing reel comprising:

a frame; and an operating mechanism on the frame including a line carrying spool, a first element for directing line onto the line carrying spool, first means cooperating between the first element and the frame for mounting the first element for rotation relative to the frame in a first direction about a first axis as an incident of which line is wrapped around the line carrying spool, and second means for selectively preventing the first element from rotating oppositely to the first direction around the first axis, wherein the second means includes a clutch assembly having inner and outer rings, third means cooperating between the first element and one of the inner and outer rings for keying the one of the inner and outer rings to the first element so that the one of the inner and outer rings is fixed against rotation relative to the first element around the first axis, fourth means cooperating between the inner and outer rings for a) permitting rotation of the other of the inner and outer rings relative to the one of the inner and outer rings in one direction around the first axis and b) preventing rotation of the other of the inner and outer rings relative to the one of the inner and outer rings oppositely to the one direction around the first axis, and fifth means cooperating between the frame and clutch assembly for selectively c) limiting rotation of the other of the inner and outer rings relative to the frame and d) permitting continuous rotation of the other of the inner and outer rings relative to the frame, wherein the fifth means comprises an actuator, means for mounting the actuator to the frame for movement as a unit selectively relative to the frame in a first predetermined path between first and second positions, and means cooperating between the actuator and the other of the inner and outer rings for limiting rotation of the other of the inner and outer rings relative to the frame with the actuator in the first position and permitting continuous rotation of the other of the inner and outer rings relative to the frame with the actuator in the second position, wherein the fifth means includes an intermediate member, means for mounting the intermediate member to the frame for movement relative to the frame between engaged and disengaged positions, means cooperating between the intermediate member and the other of the inner and outer rings for limiting rotation of the other of the inner and outer rings relative to the frame with the intermediate member in the engaged position and for permitting continuous rotation of the other of the inner and outer rings relative to the frame with the intermediate member in the disengaged position, there further being means cooperating between the actuator and intermediate member for moving the intermediate member from the disengaged position into the engaged position as an incident of the actuator moving from the second position into the first position, wherein the means for mounting the intermediate member to the frame comprises means for mounting the intermediate member to the frame for rotation about an axis that is transverse to the first axis, wherein the intermediate member acts directly against the other of the inner and outer rings and the actuator acts directly against the intermediate member as the actuator moves between the first and second positions in changing its intermediate member between the engaged and disengaged positions.

10. The fishing reel according to claim 9 wherein the means cooperating between the intermediate member and the other of the inner and outer rings comprises a finger which moves radially inwardly relative to the first axis to against the other of the inner and outer rings as the intermediate member moves from the disengaged position into the engaged position.

* * * * *